(12) United States Patent
Huelsman et al.

(10) Patent No.: US 7,565,337 B2
(45) Date of Patent: Jul. 21, 2009

(54) BATCH VALIDATION METHOD, APPARATUS, AND COMPUTER-READABLE MEDIUM FOR RULE PROCESSING

(76) Inventors: David L. Huelsman, 211 Cantwell Ct., Reynoldsburg, OH (US) 43068; Sharon E. Love, 1204 W. 39th St., Austin, TX (US) 78758; Douglas M. Mair, 554 Timberlake Dr., Westerville, OH (US) 43081

(*) Notice: Subject to any disclaimer, the term of this patent is extended or adjusted under 35 U.S.C. 154(b) by 261 days.

(21) Appl. No.: 10/950,622

(22) Filed: Sep. 28, 2004

(65) Prior Publication Data

US 2005/0080798 A1    Apr. 14, 2005

Related U.S. Application Data

(60) Provisional application No. 60/506,156, filed on Sep. 29, 2003.

(51) Int. Cl.
*G06N 5/00* (2006.01)

(52) U.S. Cl. .......................................... 706/45; 706/47

(58) Field of Classification Search .................. 706/45, 706/47; 707/203
See application file for complete search history.

(56) References Cited

U.S. PATENT DOCUMENTS

| | | | |
|---|---|---|---|
| 5,212,771 A | | 5/1993 | Gane et al. |
| 5,301,284 A | | 4/1994 | Estes et al. |
| 5,311,424 A | * | 5/1994 | Mukherjee et al. ............ 705/29 |
| 5,576,965 A | | 11/1996 | Akasaka et al. |
| 5,630,025 A | | 5/1997 | Dolby et al. |
| 5,701,400 A | * | 12/1997 | Amado ......................... 706/45 |
| 5,745,765 A | | 4/1998 | Paseman |
| 5,805,462 A | * | 9/1998 | Poirot et al. ................... 716/18 |
| 5,809,212 A | | 9/1998 | Shasha |
| 5,844,554 A | | 12/1998 | Geller et al. |
| 5,877,966 A | | 3/1999 | Morris et al. |

(Continued)

FOREIGN PATENT DOCUMENTS

WO    9948031    9/1999

OTHER PUBLICATIONS

Mianto, Shin-ichi. "Zero-Suppressed BDDs for Set Manipulation in Combinatorial Problems" 1993, ACM, 30th ACM/IEEE Design Automation Conference. pp. 272-277.*

(Continued)

*Primary Examiner*—Wilbert L Starks, Jr.
(74) *Attorney, Agent, or Firm*—Stolowitz Ford Cowger LLP

(57) ABSTRACT

A computer-implemented method and apparatus thereof for validating combinations of product features that are compliant with existing business rules relative to a modified business rule, where the modification includes an include and/or an exclude ZDD rule component. The method comprises obtaining combinations of features compliant with the existing business rules, processing the combinations against a representation of the rule components to determine validity against the modified business rule, and providing to a user an indication of validity of the combinations relative to the modification. The processing optionally comprises forming a representation of a record-by-feature array having rows corresponding to the combinations, ordering columns of the array according to one of the rule components, and testing validity of the rows of the array against the rule component. The features or combinations arc optionally read from a database, and optionally include a service.

24 Claims, 4 Drawing Sheets

| Row | 100 | 101 | 102 | 120 | 121 | 122 | 151 | 152 | 153 |
|---|---|---|---|---|---|---|---|---|---|
| 1 | 1 | | | | 1 | | | 1 | |
| 2 | | 1 | | 1 | | | 1 | | |
| 3 | | 1 | | | 1 | | 1 | | |
| 4 | | | 1 | | | 1 | | | 1 |
| 5 | | | 1 | | | | | | 1 |

U.S. PATENT DOCUMENTS

| | | | |
|---|---|---|---|
| 5,910,898 A | | 6/1999 | Johannsen |
| 5,924,077 A * | | 7/1999 | Beach et al. ............... 705/10 |
| 5,963,953 A | | 10/1999 | Cram et al. |
| 5,987,473 A | | 11/1999 | Jorgensen |
| 6,002,854 A | | 12/1999 | Lynch et al. |
| 6,016,394 A | | 1/2000 | Walker |
| 6,031,984 A | | 2/2000 | Walser |
| 6,035,305 A | | 3/2000 | Strevey et al. |
| 6,064,982 A | | 5/2000 | Puri |
| 6,076,080 A | | 6/2000 | Morscheck et al. |
| 6,163,876 A | | 12/2000 | Ashar |
| 6,182,275 B1 * | | 1/2001 | Beelitz et al. ............... 717/175 |
| 6,256,618 B1 | | 7/2001 | Spooner et al. |
| 6,321,186 B1 * | | 11/2001 | Yuan et al. ............... 703/15 |
| 6,327,581 B1 | | 12/2001 | Platt |
| 6,349,290 B1 | | 2/2002 | Horowitz |
| 6,385,617 B1 | | 5/2002 | Malik |
| 6,389,576 B1 | | 5/2002 | Lam et al. |
| 6,396,488 B1 | | 5/2002 | Simmons et al. |
| 6,424,962 B1 | | 7/2002 | Billon |
| 6,442,732 B1 | | 8/2002 | Abramovici et al. |
| 6,519,767 B1 * | | 2/2003 | Carter et al. ............... 717/140 |
| 6,529,890 B1 | | 3/2003 | Pandit et al. |
| 6,535,883 B1 * | | 3/2003 | Lee et al. ............... 707/100 |
| 6,556,978 B1 | | 4/2003 | Ginsberg et al. |
| 6,567,814 B1 | | 5/2003 | Bankier |
| 6,598,035 B2 * | | 7/2003 | Branson et al. ............... 706/47 |
| 6,651,096 B1 * | | 11/2003 | Gai et al. ............... 709/223 |
| 6,658,458 B1 | | 12/2003 | Gai et al. |
| 6,741,975 B1 | | 5/2004 | Nakisa et al. |
| 6,795,832 B2 * | | 9/2004 | McGeorge et al. ............... 707/203 |
| 6,874,016 B1 | | 3/2005 | Gai et al. |
| 6,952,812 B2 | | 10/2005 | Abadir et al. |
| 6,961,913 B1 * | | 11/2005 | Okazaki et al. ............... 716/1 |
| 6,983,187 B2 * | | 1/2006 | Kern ............... 700/97 |
| 7,130,783 B1 | | 10/2006 | Harer et al. |
| 7,188,333 B1 * | | 3/2007 | LaMotta et al. ............... 717/106 |
| 2001/0029499 A1 | | 10/2001 | Tuatini et al. |
| 2002/0065701 A1 | | 5/2002 | Kim et al. |
| 2002/0078431 A1 | | 6/2002 | Reps |
| 2002/0095645 A1 | | 7/2002 | Rodeh |
| 2002/0108093 A1 | | 8/2002 | Moondanos et al. |
| 2002/0112213 A1 | | 8/2002 | Abadir et al. |
| 2002/0165701 A1 * | | 11/2002 | Lichtenberg et al. ............... 703/7 |
| 2002/0178432 A1 | | 11/2002 | Kim et al. |

OTHER PUBLICATIONS

Mishchenko, Alan. "An Introduction to Zero-Suppressed Binary Decision Diagrams" 2001, Jun. 8, Department of Electrical Engineering Portalnd State University. pp. 1-15.*

"Array". Microsoft Computer Dictionary, Fifth Edition. May 1, 2002. 5th ed.*

Mianto, Shin-ichi. "Zero-Suppressed BDDs for Set Manipulations in Combinatorial Problems" 1993, ACM, 30$^{th}$ ACM/IEEE Design Automation Conference. pp. 272-277.*

"Array". Microsoft Computer Dictionary, Fifth Edition. May 1, 2002. 5th ed.*

J Moller, HR Andersen, H Hulgaard, "Product Configuration over the Internet presented at", The 6th INFORMS Conference on Information Systems and Technology, Nov. 3-4, 2001, Miami Beach, Florida.

F. Aloul, M. Mneimneh, and K. Sakallah "ZBDD-Based Backtrack Search SAT Solver" International Workshop on Logic Synthesis (IWLS), New Orleans, Louisiana, pp. 131-136, 2002. url=http://www.eecs.umich.edu/~faloul/.

Jesper Moller "Configuration and E-commerce", IFORS Jul. 2002.

Cabodi, et al., Symbolic Traversals of Data Paths with Auxilary Variables, IEEE, 1994, pp. 93-96.

Panda, et al., Symmetry Detection and Dynamic Variable Ordering of Decision Diagrams, Proceedings of the 1994 IEEE/ACM International Conference on Computer-Aided Design, Nov. 1994, pp. 628-631.

Cosnard, et al., Automatic Task Graph Generation Techniques, Proceedings of the Twenty-Eighth Hawaii International Conference on System Sciences, Vo. 2, Jan. 3, 1995, pp. 113-122.

Bryant, Binary Decision Diagrams and Beyond, Enabling Technologies for Formal Verification, IEEE, 1995, pp. 236-243.

Minato, S., Representations of Discrete Funtions, Chapter 1, Graph-Based Representations of Discrete Functions, Sasao and Fujia, ed.s, 1996, Kluwer Academic Publishing, pp. 1-23.

Anderson, An Introduction to Binary Decision Diagrams, University of Denmark, Oct. 1997, pp. 8-11.

Cugola, G, et al., Exploiting an event-based infrastructure to develop complex distributed systems, Proceedings of the 20th International Conference on Software Engineering, Apr. 1998, pp. 261-270.

Gottlob, et al., The complexity of acyclic conjuctive queries, 39th Annual Symposium on Foundations of Computer Science Proceedings, Nov. 8, 1998, pp. 706-715.

Yang, Optimizing Model Checking Based on BDD Characterization,Thesis, Carnegie Melon U.,May 1999, pp. 9-11.

Ejnioui, et al., Design Partitioning on Single-chip Emulations Systems, Thirteenth International Conference on VLSI Design, Jan. 3, 2000, pp. 234-239.

Kurihara, et al., BDD Encoding for Partial Order Constraints and its Application to Expert Systems in Software Verification Domains, 2000 IEEE International Conference on Systems, Man, Cybernetics, vol. 3, 8-11, Oct. 2000, pp. 2062-2067.

Beck, M., et al., Enabling Full Service Surrogates Using the Portable Channel Representation, Proceedings of the Tenth International Conference on World Wide Web, Apr. 2001, pp. 376-385.

Minato, S., "Zero-Suppressed BDDs and Their Applications", International Journal on Software Tools for Technology Transfer, vol. 3, No. 2, pp. 156-170, Springer, May 2001.

USPTO; File History U.S. Appl. No. 10/950,809 to Huelsman et al., filed Sep. 28, 2004; Part 1, Sep. 2004 through Dec. 2007.

USPTO; File History U.S. Appl. No. 10/950,809 to Huelsman et al., filed Sep. 28, 2004; Part 2, Mar. 2007 through May 2008.

USPTO; File History U.S. Appl. No. 10/950,809 to Huelsman et al., filed Sep. 28, 2004; Part 3, May 2008 through Aug. 2008.

USPTO; File History U.S. Appl. No. 10/950,809 to Huelsman et al., filed Sep. 28, 2004; Part 4, Aug. 2008 through Feb. 2009.

USPTO; File History U.S. Appl. No. 10/950,815 to Huelsman et al., filed Sep. 28, 2004; Part 1, Sep. 2004 through Feb. 2007.

USPTO; File History U.S. Appl. No. 10/950,815 to Huelsman et al., filed Sep. 28, 2004; Part 2, May 2007 through Feb. 2009.

* cited by examiner

| Row | 100 | 101 | 102 | 120 | 121 | 122 | 151 | 152 | 153 |
|---|---|---|---|---|---|---|---|---|---|
| 1 | 1 |   |   |   | 1 |   |   | 1 |   |
| 2 |   | 1 |   | 1 |   |   | 1 |   |   |
| 3 |   | 1 |   |   | 1 |   | 1 |   |   |
| 4 |   |   | 1 |   |   | 1 |   |   | 1 |
| 5 |   |   | 1 |   |   |   |   |   | 1 |

Fig. 1

| New Row | Original Row | 151 | 152 | 153 | 100 | 101 | 102 | 120 | 121 | 122 | Validity |
|---|---|---|---|---|---|---|---|---|---|---|---|
| 1 | 2 | 1 |   |   |   | 1 |   | 1 |   |   | False |
| 2 | 3 | 1 |   |   |   | 1 |   |   | 1 |   | False |
| 3 | 1 |   | 1 |   | 1 |   |   |   | 1 |   | False |
| 4 | 4 |   |   | 1 |   |   | 1 |   |   | 1 | False |
| 5 | 5 |   |   | 1 |   |   |   | 1 |   |   | False |

Fig. 2

| New Row | Original Row | 151 | 152 | 153 | 100 | 101 | 102 | 120 | 121 | 122 | Validity |
|---|---|---|---|---|---|---|---|---|---|---|---|
| 1 | 3 | 1 | | | | 1 | | | 1 | | True |
| 2 | 4 | | | 1 | | 1 | | | | 1 | True |
| 3 | 5 | | | 1 | | | | 1 | | | True |

Fig. 3

| New Row | Original Row | 120 | 121 | 122 | 151 | 152 | 153 | 100 | 101 | 102 | Validity |
|---|---|---|---|---|---|---|---|---|---|---|---|
| 1 | 5 | 1 |   |   |   |   | 1 |   |   |   | True |
| 2 | 3 |   | 1 |   | 1 |   |   |   | 1 |   | True |
| 3 | 4 |   |   | 1 |   |   | 1 |   |   | 1 | True |

Fig. 4

BATCH VALIDATION METHOD, APPARATUS, AND COMPUTER-READABLE MEDIUM FOR RULE PROCESSING

CROSS-REFERENCE TO RELATED PATENTS AND PATENT APPLICATIONS

This invention claims the benefit of Provisional Application Ser. No. 60/506,156 filed on Sep. 29, 2003 in the names of Huelsman, et al., entitled Improved Method and Apparatus for Rule Processing, which is incorporated herein.

This invention is also related to U.S. patent application Ser. Nos. 10/101,151 and 10/101,154, each filed on Mar. 20, 2002 in the names of the same inventors hereof, which are incorporated herein.

BACKGROUND

This invention concerns an improvement to a method or apparatus for rule processing utilizing binary decision diagrams to express and manipulate a business rule, but more specifically, to a method, an apparatus, and a computer-readable medium to validate multiple records indicative of compliancy of criteria, e.g., attributes and enumerations of such attributes expressed in a binary decision diagram, relative to a new or modified business rule.

Specialized applications use rule processing implemented one a computer to drive high volume transaction processing utilities. These applications typically involve separating a relatively large volume of transaction records into two groups based on whether the individual records thereof conform with, or conflicts with certain business rules. An example of a batch validation application includes validating a large number of previously sold product configurations, e.g., stored data records, against a new set of proposed configuration rules in order to determine the validity of the existing or previously sold product configurations under the new configuration rules. When configurations are complex or numerous, prior techniques proved inadequate or required validation on an individual basis.

SUMMARY

According to an aspect of the present invention, one improvement comprises a computer-implemented method of validating combinations of product features (or specifications) that are compliant with an existing business rule relative to a modification thereof that includes at least one include Zero-suppressed binary Decision Diagram (ZDD) rule component and/or one exclude ZDD rule component. The method comprises identifying combinations of features compliant with the existing business rule, processing the combinations against a representation of the include ZDD rule component and/or exclude rule component of the modified rule to determine validity, and providing to a user, such as a product manager, an indication of validity of the combinations relative to the modification whereby to validate the existing set of user-selected criteria against a new or modified business rule. In a further embodiment, the processing step of the improvement comprises forming a representation of a record-by-feature array indicative of the combinations, re-ordering the features (or specifications) according to at least one include and/or exclude ZDD rule component, testing the validity of re-ordered features against each rule component; and providing an output indicating to a user or product manager whether the re-ordered product features are compliant. Product features or combinations may be read from a database and the product may include a service.

In accordance with another aspect of the invention, the improvement is utilized in a rule processing method utilizing binary decision diagrams or other representation thereof (e.g., zero-suppress binary decision diagrams) to determine compliancy relative to a business rule. In this case, the improvement comprises a computer-implemented method of validating multiple data records stored in a computer memory representing user-selected enumerations (e.g., product specifications) relative to a modification of the rule. The improved method comprises obtaining data records indicative of user-selected enumerations that are compliant with the rule; forming a record-by-enumeration array of the records and enumerations; re-ordering enumerations of the array according to any include rule components of a modified rule, sorting the data records according to the re-ordering, determining a validity of the record according to existence of a path in the include rule component of the modified rule embodying re-ordered enumerations of the data records, and forming a resulting array by removing records having an invalid determination; re-ordering enumerations of the resulting array according to any exclude rule component of the modified rule, sorting records of the resulting array according to any exclude rule component, determining validity of records of the resulting array according to existence of a path in the exclude rule component embodying the re-ordered enumerations, and forming a final array by removing records having an invalid determination; and communicating to an end user an indication of those records of the final array that are fully compliant with the include and exclude rules components of the modified rule.

In yet another embodiment of the invention, there is provided an apparatus that validates multiple data records indicative of user-selected criteria relative to a modified or updated rule to determine compliancy of the criteria relative to the modification where the apparatus comprises an input (e.g., a GUI interface, keyboard, and/or pointing device) that obtains the criteria from a stored database, a processor including routines to form a representation of a record-by-enumeration array indicative of the criteria, to re-order enumerations of the array according to a ZDD rule component of the modified or updated rule, to determine validity of records having combinations of re-ordered enumerations relative to the ZDD rule component, and an output to provide a list of products to an end-user having valid combinations of enumerations. The ZDD rule component may include one or more include rule and exclude rule components. The user-selected criteria may comprise configuration parameters representing valid combination of components of a product or service.

In yet a further embodiment of the invention, there is provided a computer-readable medium including instructions to effect acquisition of a set of data records stored in a memory including combinations of enumerations compliant with an existing rule, to form a representation of a record-by-enumeration array indicative of the set, to re-order enumerations of the array according to a ZDD rule component of a modified business rule, to determine the validity of data records having re-ordered combinations of enumerations relative to the ZDD rule component, and to provide a list of products to an end-user having valid combinations of enumerations (e.g., valid product specifications). The ZDD rule component may comprises and/or exclude rule components. The combinations may comprise product or service configuration parameters.

The invention may also be implemented via a network using client-server communication, including a local area network or an Internet.

Other aspects, features, and embodiments will become apparent upon review of the following description of the illustrative embodiment taken in connection with the accompanying drawings. The invention, though, is pointed out with particularity by the appended claims.

BRIEF DESCRIPTION OF THE DRAWINGS

FIG. 1 shows a truth table representing set of valid combinations or product features relative to an exemplary business rule.

FIG. 2 is re-ordered, sorted representation of the table of FIG. 1 according to an include rule component of a modified or new rule.

FIG. 3 shows the results of excluding invalid combinations or records of the table of FIG. 2 relative to include rule components.

FIG. 4 shows the further results of excluding invalid combinations or records of the table of FIG. 3 relative to exclude rule components.

DESCRIPTION OF ILLUSTRATIVE EMBODIMENT

According to one aspect of the present invention, the improved method and apparatus provides a indication of each transaction or data record that is valid against a new or modified business rule. In the illustrated embodiment, the method or apparatus begins by obtaining a set of user-selected attributes, usually stored in a database. The data records may be obtained remotely over a local or wide area network. Exemplary software routines to effect operation of the method is set forth in the Appendix, which may be stored or transferred using a computer-readable medium.

Each selection comprises a set of enumerations previously selected by a user in connection with an existing business rule, such as a product configuration rule. FIG. 1, for example, shows five user selections or attributes. The first selection, Row 1, has enumerations 100, 121 and 152 selected. The second selection has enumerations 101, 120 and 151 selected, and so on . . . . Thus, the five selections, which are individually stored in a data record, may be represented as follows: {{100, 121, 152}, {101, 120, 151}, {101, 121, 151}, {102, 122, 153}, {120, 153}}. To validate these selections or product configuration records, the method and apparatus of the present invention separately processes updated include and exclude rule components of a modified or new rule and communicate the results of the analysis to an end user, e.g., a product or production manager of a product or service marketed to a consumer.

To perform Include rule processing, selections are formed into a two-dimensional record-by-enumeration array having vertical columns and horizontal rows, as shown in FIG. 2. Only those columns having selections are included in the array while the remaining columns may be omitted. The columns of the array represent the enumerations. Next, the columns are ordered the same order as enumerations in the Include ZDD component of the new or modified rule (if any) against which the selections are to be validated. In this example, the Include ZDD enumeration ordering is (151, 152, 153, 100, 101, 102, 120, 121, 122). The rows of the array are then sorted (preferably descending) according to this column ordering. Finally, a validity column is denoted or appended to the end.

Each row or record in the array of FIG. 2 represents a single user selected criteria. The first row, for example, indicates the combination of Enum151, Enum101 and Enum120 in the user-selected criteria. If this combination exists in the Include ZDD tree of the new or modified rule, the validity column for the first row becomes True and this value is stored or associated with the record in under examination.

If the new or modified rule model has no Include rules, the Validity column is set to true and any remaining Include processing is skipped. Processing then immediately proceeds to the Exclude rule processing.

If all enumerations for each group are grouped together, the above table may be represented in the following manner:

| Group1 | Group1 | Group2 | Group3 | Validity | Fully Specified |
|---|---|---|---|---|---|
| 1 | 151 | 101 | 120 | False | Yes |
| 2 | 151 | 101 | 121 | False | Yes |
| 3 | 152 | 100 | 121 | False | Yes |
| 4 | 153 | 102 | 122 | False | Yes |
| 5 | 153 | — | 120 | False | No |

As seen, the second row or record is almost identical to the first row, except that implementation of the inventive method involves searching for Enum121 on the second pass through the Include ZDD. Multi-OR selections is handled this way in that the record must be split into individual rows and then searched. Preferably, no row may have more than one enumeration per group.

Viewing the re-characterized table, it is seen that rows 1 through 4 are fully specified meaning that there is an enumeration from each group. Row 5 is not specified. For row 5, Group 2 is treated as a DC (don't care) value.

Fully specified Processing:

The process for finding validity is quicker for fully specified rows, which is achieved by scanning down the ZDD tree of the new or modified rule model and comparing the index of the node encountered to the column index of the array.

Upon encountering a zero in the data, process travels down the "else" side of matching nodes.

Upon encountering a one in the data, the process travels down the "then" side of the matching nodes.

As long as the process continues to encounter nodes that are in this combination, it continues.

Upon encountering a node whose ordering in the ZDD tree is smaller than the ordering of the index being searched for, the process travels down the "else" side of the node.

Upon encountering a node whose ordering in the ZDD tree is larger than the ordering of the index being searched for, then the process need not continue the scanning; and it then knows that the combination is not valid.

Upon encountering the "one" node, then the process has found a valid path and the validity for the row becomes True.

To improve speed, the improved method and apparatus may include buffering of the nodes encountered while scanning down the ZDD tree. Once a determination of the validity for a row has been made, the process proceeds to the next row or record. For fully specified rows, the process skips columns that are the same as the previous row. In the illustrated example, upon encountering nodes 151, 101, and 120 for row one, the process starts with node 101 and scans for node 121 on row two.

Non-Fully Specified Processing:

As the method and apparatus analyzes or processes the user-selected combinations row by row relative to nodes in the Include ZDD, its switches back and forth between fully specified and non-fully specified rows, as needed. The main difference between the two involves what happens when encountering indexes in the ZDD tree lacking a column in the array. For non-fully specified rows, such nodes are skipped, that is, they are treated as a DC (don't care). This adds processing time due to the need to consider both the "then" and the "else" sides of these nodes.

Exclude Processing:

If the modified rule model has no exclude rules, exclude processing is skipped. If, on the other hand, the new or modified rule includes exclude rule components, the analysis continues. After completing the include scanning, the resulting array will be found to have some valid combinations and some invalid combinations, e.g., rows or records of the resulting array. At this point, the process or apparatus removes or suppresses invalid rows to form a new resulting array, as shown in FIG. 3. The columns are then reordered according to the order of indexes in the Exclude ZDD rule component of the modified or new rule against which the selections are to be validated. In the illustrated example, the enumeration ordering in the Exclude ZDD rule is (120, 121, 122, 151, 152, 153, 100, 101, 102). The rows are also sorted (preferably in descending order), which renders the array of FIG. 4.

The method and/or apparatus uses the resulting array to scan through the Exclude ZDD component in order to invalidate any excluded combinations. It is not necessary to find the entire combination in the Exclude ZDD rule component to determine or denote an invalidation. If a portion of a combination on a path in the Exclude ZDD is found, then the entire combination is excluded thus invalidating that row in the array.

The rows of the array of FIG. 4 that have validity indication of True are thus validated according to the invention. The resulting array is returned to the calling routine of the rule processing system or method and/or conveyed to an end user. The validation results may be displayed for visual observation on a computer monitor, fed to an I/O device for hard copy printing of results, or simply stored in a memory for subsequent use by an end user.

Based on the above teachings, the invention also embraces modifications not explicitly shown in the drawings or written description, or illustrated by the exemplary code found in the attached Appendix. In particular, the invention is preferably practiced utilizing zero-suppressed binary decision diagrams (ZDDs) but software emulations or other representations of ZDDs may be employed to achieve substantially the same results. A computer-readable medium embodying software routines may comprise a magnetically or optically medium, as known in the art. These routines may also be conveyed via a network, and temporarily stored in a communication or network processor before reaching a computer apparatus for execution. Typically, a keyboard and pointing device (e.g., a mouse) is used to supply inputs to a GUI (graphical user interface) of a processor. The GUI also is used to provide results to the user. A processor (desktop, handheld, or other portable computing device) typically implements the method. Access and transfer of data may occur locally or via a network, e.g. the Internet or a LAN. Also, the illustration was directed to a product configuration business rule, but may be extended to other scenarios to the same extent described in the incorporated and related patents and patent applications. Accordingly, the disclosure is not intended to limit the scope of the invention set forth by the appended claims.

Appendix

Notation Used

The notation used for attributes in this document is "Attr" followed by a number. The first attribute in the examples is Attr1.

The notation for enumerations is "Enum" followed by two numbers. The first number is the attribute that it belongs to. The second number is its number within the attribute from 1 to 5.

The ellipses symbol ". . . " is used to show a range of enumerations.

For convenience and illustration, every attribute in the examples shown herein has five (5) enumerations.

The word "related" means that the attributes are in the same rule. The double arrow symbol "←→" also means that the attributes are related.

Batch Validation Routine

Description: Routine to quickly get validity for a large group of selections. Does not provide any advice information. Multi-OR is not supported. A work around is to split out the multiple enumerations in a selection, into separate selections. Handles fully specified selections and partially specified selections.

Exemplary Code

The batch validation routine must be called through an API interface, it is not executed during the engine advice run. The main entry point is FindValidPicksFromBatch.

```
/*************************************************************
******\
    Proc: SkipOverBlanks
    Description:
        Skip over blanks in the pick set.
\*************************************************************
******/
int SkipOverBlanks(PickInfo &p, int nRow, int nCol, int findex)
{
    while ( (((findex != p.aTrans[nCol]) &&
                (p.aPicks[nRow][nCol] == 0) &&
                (nCol < p.nTotPickCols)) ||
                (p.aPickIncludeGroup[nCol] == UNINITIALIZED_VALUE) )
        nCol++;
    if (nCol >= p.nTotPickCols)
        nCol = p.nTotPickCols-1;
    return nCol;
}
/*************************************************************
*\
    Proc: FindValidPicksFromBatch
```

-continued

```
Description:
    This routine will search a set of picks and fill in the validity column for
    those that are valid. It is given a two dimensional array that has the picks
    in it. This array must be sorted. The aTrans array translates columns in the
    pick array to indexes in the tree.
\********************************************************************************
*/
RebsDD__API FindValidPicksFromBatch(PickInfo &p)
{
    int             nCol, nRow;
    BddErrorCode    retVal = ecSuccess;
    if ((ecSuccess == (retVal = GetBddFromHandle(p.hBddX, &p.fX, &p.ddX))) &&
        (ecSuccess == (retVal = GetBddFromHandle(p.hBddI, &p.fI, &p.ddI))) )
    {
        //-----------------------------------------------
        // Include finder
        // Setup
        bool            bPickFS, bPrevPickFS;
        int             nNumGroups = g__ManagerTableArray[p.hBddI].nGroups;
        IntArray        &aEnumInGroup = GetVariableGroups(p.hManagerI);
        IntArray        &aGroupUsed = g__ManagerTableArray[p.hManagerI].aGroupUsed;
        p.aPickForGroup = (int *)calloc(nNumGroups, sizeof(int));
        p.aIndexUsed.assign(g__ManagerTableArray[p.hManagerI].aIndexUsed);
        p.aPickIncludeGroup = (int *)calloc(p.nTotPickCols, sizeof(int));
        p.aSNodes = (Dm__Node **)malloc(p.nTotPickCols* sizeof(Dm__Node *));
        for (nCol=0; nCol<p.nTotPickCols; nCol++)
            p.aSNodes[nCol] = NULL;
        // Build the array to tell if a pick is specified in the include.
        for (nCol=0; nCol<p.nTotPickCols; nCol++)
        {
            int nGroup = aEnumInGroup[p.aTrans[nCol]];
            if (aGroupUsed[nGroup])
                p.aPickIncludeGroup[nCol] = nGroup;
            else
                p.aPickIncludeGroup[nCol] = UNINITIALIZED__VALUE;
        }
        // Make the Picks order match the trees order.
        // Note:    The array is expected to be in the correct column order
        //          and sorted row-wise. The array should also be sorted row-wise
        //          in a descending fashion.
        bPrevPickFS = false;
        for (nRow=0; nRow<p.nTotPickRows; nRow++)
        {
            Dm__Node    *pZdd = p.fI;
            int         nMatchCol = 0;
            // Only do checks if validity hasn't already been determined.
            bPickFS = true;
            if (p.aPicks[nRow][p.nValidityCol] == UNINITIALIZED__VALUE)
            {
                // Determine if this row is FS.
                for (int nGroup=0; nGroup<nNumGroups; nGroup++)
                {
                    if ((p.aPickForGroup[nGroup] == UNINITIALIZED__VALUE) &&
aGroupUsed[nGroup])
                    {
                        bPickFS = false;
                        break;
                    }
                }
                if (bPickFS)
                {
                    // Find matching column between this row and previous row.
                    if (bPrevPickFS)
                    {
                        for (nCol=0; nCol<p.nTotPickCols; nCol++)
                        {
                            if (p.aPicks[nRow-1][nCol] != p.aPicks[nRow][nCol])
                            {
                                break;
                            } else {
                                if ((p.aPicks[nRow][nCol] == 1) && (p.aSNodes[nCol]
!= NULL))
                                {
                                    pZdd = p.aSNodes[nCol];
                                    nMatchCol = nCol;
                                }
                            }
                        }
                    }
```

```
                FindValidPicksIFS(p.ddI, pZdd, p, nRow, nMatchCol);
            } else {
                // Initialize the group array by filling it with the picks.
                memset(p.aPickForGroup, UNINITIALIZED_VALUE, nNumGroups *
sizeof(int));
                for (nCol=0; nCol<p.nTotPickCols; nCol++)
                {
                    if (p.aPickIncludeGroup[nCol] != UNINITIALIZED_VALUE)
                    {
                        int nPickValue = p.aTrans[nCol];
                        if (p.apicks[nRow][nCol] == 1)
                            p.aPickForGroup[ p.aPickIncludeGroup[nCol] ] =
nPickValue;
                    }
                }
                nMatchCol = SkipOverBlanks(p,nRow, nMatchCol, pZdd->index);
                FindValidPicksICover(p.ddI, pZdd, p, nRow, nMatchCol);
            }
        } else
            bPickFS = false;
        bPrevPickFS = bPickFS;
    }
    // Cleanup the include finder.
    free(p.aSNodes);
    free(p.aPickIncludeGroup);
    free(p.aPickForGroup);
    //------------------------------------------------
    // Debug print the Picks array
    {
        char    sDebug[255];
        OutputDebugString("Picks:\n");
        DebugDump1dArray(" ", p.aTrans, p.nTotPickCols, "%3.3d ", "Val\n");
        for (nRow=0; nRow<p.nTotPickRows; nRow++)
        {
            sprintf(sDebug, "%d: ", nRow);
            DebugDump1dArray(sDebug, p.aPicks[nRow], p.nTotPickCols+1, "[%d]
", "\n");
        }
    }
    //------------------------------------------------
    // Exclude finder
    // Alloc the memory
    p.aExCounts = (int *)calloc(p.ddX->sizeZ, sizeof(int *));
    p.aExCurPath = (int *)calloc(p.ddX->sizeZ, sizeof(int *));
    // Copy the include picks to the exclude picks.
    p.aExPicks = (int **)malloc(p.nTotPickRows * sizeof(int *));
    for (nRow=0; nRow<p.nTotPickRows; nRow++)
    {
        bool    bFoundInInclude = false;
        // Set the validity column.
        p.aExPicks[nRow] = (int *)calloc((p.ddX->sizeZ+1), sizeof(int));
        p.aExPicks[nRow][p.ddX->sizeZ] = p.aPicks[nRow][p.nValidityCol];
        // Set the individual indexes.
        for (nCol=0; nCol<p.nTotPickCols; nCol++)
        {
            if (p.aPicks[nRow][nCol] == 1)
            {
                int nPickValue = p.aTrans[nCol];
                p.aExPicks[nRow][nPickValue] = 1;
                p.aExCounts[nPickValue]++;
                if (p.aPickIncludeGroup[nCol] != UNINITIALIZED_VALUE)
                    bFoundInInclude = true;
            }
        }
        if (!bFoundInInclude || (p.nTotPickCols == 0))
            p.aExPicks[nRow][p.ddX->sizeZ] = 1;
    }
    //------------------------------------------------
    // Debug print the Picks array
    {
        char    sDebug[255];
        for (nRow=0; nRow<p.nTotPickRows; nRow++)
        {
            sprintf(sDebug, "%d: ", nRow);
            DebugDump1dArray(sDebug, p.aExPicks[nRow], p.ddX->sizeZ+1, ".",
"\n");
        }
        DebugDump1dArray("Cnts: ", p.aExCounts, p.ddX->sizeZ, ".", "\n");
    }
```

```
        // Exclude any picks that have all of the indexes from any path of
        // the exclude tree.
        p.aExPathLen = 0;
        FindValidPicksX(p.ddX, p.fX, p, 0, 0);
        // Move the validity column from the exclude picks to the include picks.
        for (nRow=0; nRow<p.nTotPickRows; nRow++)
              p.aPicks[nRow][p.nValidityCol] = p.aExPicks[nRow][p.ddX->sizeZ];
        // Cleanup the exclude finder.
        // Free the array elements
        for (nRow=0; nRow<p.nTotPickRows; nRow++)
              free(p.aExPicks[nRow]);
        free(p.aExPicks);
        free(p.aExCounts);
        free(p.aExCurPath);
        p.aIndexUsed.setSize(0);
        //-------------------------------------------------
        // Debug print the results
        {
              char      sDebug[255];
              OutputDebugString ("Picks:\n");
              DebugDump1dArray(" ", p.aTrans, p.nTotPickCols, "%3.3d ", "Val\n");
              for (nRow=0; nRow<p.nTotPickRows; nRow++)
              {
                    sprintf(sDebug, "%d: ", nRow);
                    DebugDump1dArray(sDebug, p.aPicks[nRow], p.nTotPickCols+1, "[%d] ", "\n");
              }
        }
      }
      return retVal;
}
/************************************************************************
******\
      Proc: FindValidPicksX
\************************************************************************
******/
bool FindValidPicksX(Dm_Manager *ddX, Dm_Node *fX, PickInfo &p, int nPickRow, int
nPickCol)
{
      bool      bRet;
      int       nRow, nCol, nPickIndex;
      bRet = false;
      if (fX == Dm_ONE(ddX))
      {
            // We are at the end of a complete path to 1.
            // Now we will find any picks which have all of the current path on it.
            bool bFoundAValid = false;
            for (nRow=0; nRow<p.nTotPickRows; nRow++)
            {
                  // Assume that we have found a row to exclude.
                  bool      bFoundARowToExclude = true;
                  // Only check rows that are valid.
                  if (p.aExPicks[nRow][p.ddX->sizeZ] == 1)
                  {
                        for (nPickIndex=0; nPickIndex<p.aExPathLen; nPickIndex++)
                        {
                              if (p.aExPicks[nRow][ p.aExCurPath[nPickIndex] ] == 0)
                              {
                                    bFoundARowToExclude = false;
                                    break;
                              }
                        }
                        // We found a row that needs to be excluded.
                        if (bFoundARowToExclude == true)
                        {
                              // Set the validity for this row to zero and decrease the
counts.
                              p.aExPicks[nRow][p.ddX->sizeZ] = 0;
                              // Update the counts for every index on the path.
                              for (nCol=0; nCol<p.ddX->sizeZ; nCol++)
                                    if (p.aExPicks[nRow][nCol] == 1)
                                          p.aExCounts[nCol]--;
                        } else {
                              bFoundAValid = true;
                        }
                  }
            }
            bRet = ! bFoundAValid;
      } else if (fX == Dm_ZERO(ddX)) {
```

-continued

```
        } else {
            // If the count is zero (or less) for this index, then there aren't
            // any more valid rows with this index.
            if (p.aExCounts[fX->index] > 0)
            {
                p.aExCurPath[p.aExPathLen++] = fX->index;        // Add the current index
to the path.
                // Move down the then branch for this subtree.
                bRet = FindValidPicksX(ddX, Dm_T(fX), p, nPickRow, nPickCol+1);
                p.aExPathLen--;                  // Remove the topmost index from the path.
            }
            // Move down the else branch for this subtree.
            bRet = FindValidPicksX(ddX, Dm_E(fX), p, nPickRow, nPickCol);
        }
        return bRet;
}
/***********************************************************************
******\
        Proc: FindValidPicksIFS
        Description:
            Find out if the fully specified pick in row nPickRow is in the zdd.
            Since the picks are fully specified, we can make the correct decision at
each
            node of the tree. We don't have to search for parts of the pick
scattered
            throughout the tree.
\***********************************************************************
******/
int FindValidPicksIFS(Dm_Manager *dd, Dm_Node *f, PickInfo &p, int nPickRow, int
nPickCol)
{
        int          nRet = 0;
        Dm_Node      *pElse;
        if (f == Dm_ONE(dd))
        {
            p.aPicks[nPickRow][p.nValidityCol] = 1;
            return nPickCol;
        }
        if (f == Dm_ZERO(dd))
            return nPickCol;
        // Skip over blank columns
        nPickCol = SkipOverBlanks(p, nPickRow, nPickCol, f->index);
        // Put this node in the cache.
        if (f->index == p.aTrans[nPickCol])
            p.aSNodes[nPickCol] = f;
        // Check if node matches the current pick column value.
        if ((f->index == p.aTrans[nPickCol]) && (p.aPicks[nPickRow][nPickCol] == 1))
        {
            // Its a match, so try next node & pick column.
            nRet = FindValidPicksIFS(dd, Dm_T(f), p, nPickRow, nPickCol+1);
        } else {
            pElse = Dm_E(f);
            if (!Dm_IsConstant(pElse))
                nRet = FindValidPicksIFS(dd, pElse, p, nPickRow, nPickCol);
            else {
                p.aPicks[nPickRow][p.nValidityCol] = 0;
                nRet = nPickCol;
            }
        }
        return nRet;
}
/***********************************************************************
\
        Proc: FindValidPicksICover
        Description:
            Find out if the pick in row nPickRow is in the zdd. The specified pick may be
            a cover. So this routine will skip over non-matching picks as if they are
DC's.
            I may be able to use the path rule that "only 1 member of a group can be on a
            path to one". If I have hit any other member of the current picks group, then
            I can ignore the whole "Then" subtree. We may need to add an array that is the
            size of #groupsInModel. At the beginning of a path, we clear out this array.
            As we go down the path, we fill in this array. If we hit a pick that already
has
            an element in its group position, then we can stop processing that pick. This
            would allow us to exit paths much earlier.
\***********************************************************************
/
int FindValidPicksICover(Dm_Manager *dd, Dm_Node *f, PickInfo &p, int nPickRow, int
```

```
nPickCol)
{
    int         nCol,
                nRet = 0;
    IntArray    &aEnumInGroup = GetVariableGroups(p.hManagerI);
    // Check if we are already valid.
    if (p.aPicks[nPickRow][p.nValidityCol] == 1)
        return nPickCol;
    if ((f == Dm__ONE(dd)) && (nPickCol < p.nTotPickCols))
    {
        bool    bAllUnused = true;
        int     ix;
        for (ix=nPickCol; ix<p.nTotPickCols; ix++)
        {
            if ((p.aPicks[nPickRow][nPickCol] == 1) &&
                (p.aPickIncludeGroup[ix] != UNINITIALIZED_VALUE))
            {
                bAllUnused = false;
                break;
            }
        }
        if (bAllUnused)
            p.aPicks[nPickRow][p.nValidityCol] = 1;
        return nPickCol;
    }
    // Handle the case where an index isn't in the tree at all.
    if (p.aIndexUsed[p.aTrans[nPickCol]] == false)
    {
        if (p.aPickIncludeGroup[nPickCol] == UNINITIALIZED_VALUE)
        {
            // This index is an Always.
            if ((p.aPicks[nPickRow][nPickCol] == 0) && (nPickCol ==
p.nTotPickCols))
            {
                // We were at the last column, so this row is valid.
                nPickCol++;
                p.aPicks[nPickRow][p.nValidityCol] = 1;
                return nPickCol;
            }
        } else {
            // This index is a Never.
            if (p.aPicks[nPickRow][nPickCol] == 1)
            {
                p.aPicks[nPickRow][p.nValidityCol] = 0;
                return nPickCol;
            }
        }
        // Column is unused by include, so skip this column.
        return FindValidPicksICover(dd, f, p, nPickRow, ++nPickCol);
    }
    // Skip over blank columns
    nPickCol = SkipOverBlanks(p, nPickRow, nPickCol, f->index);
    // Check if node matches the current pick column value.
    if (dd->permZ[f->index] < dd->permZ[p.aTrans[nPickCol]])
    {
        // We are at a node index in the tree that is higher than the next picks index.
        // We can skip the entire then side of this node if it is a member of
        // a group that we already have a pick for. So we only check the then side
        // if the aPickForGroup is empty for its group.
        if (p.aPickForGroup[ aEnumInGroup[f->index] ] == UNINITIALIZED_VALUE)
            nRet = FindValidPicksICover(dd, Dm__T(f), p, nPickRow, nPickCol);
        nRet = FindValidPicksICover(dd, Dm__E(f), p, nPickRow, nPickCol);
    } else if (f->index == p.aTrans[nPickCol]) {
        if (p.aPicks[nPickRow][nPickCol] == 1)
        {
            // Its a match, so try next node & pick column.
            bool bFoundLastPick = true;
            if (npickCol < p.nTotPickCols)
                for (nCol=nPickCol+1; nCol<p.nTotPickCols; nCol++)
                    if (p.aPicks[nPickRow][nCol] == 1)
                    {
                        bFoundLastPick = false;
                        break;
                    }
            if (bFoundLastPick == true)
                p.aPicks[nPickRow][p.nValidityCol] = 1;
            else
                nRet = FindValidPicksICover(dd, Dm__T(f), p, nPickRow, nPickCol+1);
        } else {
```

```
            nRet = FindValidPicksICover(dd, Dm_E(f), p, nPickRow, nPickCol+1);
        }
    } else {
        // We are at a node in the tree that is deeper than the next pick that we
        // were looking for. So, we can skip the rest of this subtree.
        if (p.aPicks[nPickRow][p.nValidityCol] != 1)
            p.aPicks[nPickRow][p.nValidityCol] = 0;
    }
    return nRet;
}
```

The invention claimed is:

1. A method of validating an existing product configuration comprising:

storing one or more particular combinations of features associated with the existing product configuration that are compliant with an existing business rule in a memory for access by an application program executed on a processing system, where each feature is associated with one or more enumerations;

using the application program executed on the processing system to process each of the one or more particular combinations against a representation of at least one of a component indicating included combinations of features or a component indicating excluded combinations of features of a modification of the existing business rule by:

forming a record-by-enumeration array comprising one or more rows representing one or more features and one or more columns representing one or more enumerations associated with each of the one or more particular combinations of features;

ordering the one or more columns according to the at least one of the component indicating included combinations of features or the component indicating excluded combinations of features of the modification of the existing business rule;

sorting the one or more rows responsive to the ordering of the one or more columns;

testing each one of the one or more rows against the at least one of the components indicating included combinations of features or the component indicating excluded combinations of features to determine validity of the row, the validity of the row indicating the validity of the respective combination relative to the modification of the existing business rule; and denoting the validity in a column of the record-by-enumeration array.

2. The method of claim 1 where the storing comprises reading the particular combinations from a database.

3. The method of claim 2 where the features include a service.

4. The method of claim 1, where each of the columns corresponds to one of the features.

5. The method of claim 1, where at least one of the columns corresponds to a plurality of the features.

6. The method of claim 1, where the component indicating included combinations of features is represented as an include Zero-suppress binary Decision Diagram (ZDD).

7. The method of claim 1, where the component indicating excluded combinations of features is represented as an exclude Zero-suppress binary Decision Diagram (ZDD).

8. A computer-implemented method, comprising:

accessing a database stored in a memory using an application program executed on a processing system to obtain a plurality of records each defining an existing product configuration compliant with an existing rule;

using the application program, representing a modification of one or more rules validating enumerations of the plurality of records as at least one Zero-suppress Decision Diagram (ZDD) component;

using the application program, representing the plurality of records as a record-by-enumeration array, each one of one or more rows of the array representing a respective one of the records, each one of one or more columns of the array representing one or more of enumerations associated with the records;

using the application program, ordering the columns according to the at least one ZDD component;

using the application program, sorting the rows according to the ordering of the columns; and using the application program, determining validity of each of the sorted rows according to existence of a respective path in the at least one ZDD component corresponding to the enumerations of the respective record, the validity of the row indicating compliancy of the respective record; and using the application program, denoting the compliancy of the respective records in a column of the record-by-enumeration array.

9. The improvement of claim 8, where the at least one ZDD component is an include ZDD component; and where the determining validates the row according to the existence of the respective path.

10. The improvement of claim 8, where the at least one ZDD component includes an exclude ZDD component; and where the determining is configured to invalidate the row according to the existence of the respective path.

11. The improvement of claim 10, where the respective path corresponds to an initial subset less than all of the enumerations of the respective record, the enumerations of the respective record considered according to the ordering of the columns.

12. An apparatus configured to validate plurality of product data records, the apparatus comprising:

a computer readable medium; and a processor configured to execute instructions stored in the computer readable medium to:

obtain the plurality of product data records each comprising a particular combination of one or more features each having one or more enumerations defining an existing product configuration compliant with an existing business rule;

represent a modification of the existing rule as at least one Zero-suppress binary Decision Diagram (ZDD) component;

represent the plurality of product data records as a record-by-enumeration array, each one of one or more rows of the array representing a respective one of the product data records, each one of one or more columns of the array representing one or more of the enumerations associated with the plurality of records;

order the columns according to the at least one ZDD component; and determine validity of each of the rows according to the at least one ZDD component, the validity of the row indicating the compliancy of the respective product data record to the modification of the existing business rule; and denote the compliancy of the respective product data record in a column of the record-by-enumeration array.

13. The apparatus of claim 12, where the at least one ZDD component includes at least one of an include component and an exclude component.

14. The apparatus of claim 12, where the processor is further configured to retrieve the selected product data records as ones of the product data records indicative of the criteria.

15. The apparatus of claim 12, where the processor is further configured to sort the rows according to the ordering of the columns.

16. The apparatus of claim 15, where the validity of each of the rows is according to existence of a respective path in the at least one ZDD component corresponding to the enumerations of the respective product data record.

17. The apparatus of claim 16, where the processor is further configured to:

determine the validity of each of the rows in order according to the sorting of the rows, buffer nodes of at least some of the paths; and determine existence of an initial portion of the respective path corresponding to an initial subset of the enumerations of the respective product data record of a particular one of the rows based, at least in part, on the buffered nodes, the enumerations of the respective product data record considered according to the order of the columns.

18. A computer-readable medium comprising program instructions stored thereon that when executed by a processor, result in:

accessing a plurality of data records each defining a combination of enumerations of an existing product compliant with an existing rule:

forming a record-by-enumeration array indicative of the plurality of data records, each one of one or more rows of the array representing a respective one of the data records, each one of one or more columns of the array representing one or more of the enumerations;

order the columns according to a ZDD component of a modified rules;

determine validity of each of the rows according to the ZDD component, the validity of the row indicating the compliancy of the respective data record to the modified rule; and denote the compliancy of the respective data record in the record-by-enumeration array.

19. The computer-readable medium of claim 18, where the ZDD component comprises an include component or an exclude component or combinations thereof.

20. The computer-readable medium of claim 18, where the combinations comprises product configuration parameters.

21. The computer-readable medium of claim 18, where the product comprises a service.

22. The computer-readable medium of claim 18, where the product comprises a rule-based system.

23. The computer-readable medium of claim 18, further embodying program instructions to sort the rows according to the ordering of the columns.

24. The computer-readable medium of claim 18, where the validity of each of the rows is according to existence of a respective path in the ZDD component corresponding to the enumerations of the respective data record.

* * * * *

UNITED STATES PATENT AND TRADEMARK OFFICE
CERTIFICATE OF CORRECTION

| | | |
|---|---|---|
| PATENT NO. | : 7,565,337 B2 | Page 1 of 1 |
| APPLICATION NO. | : 10/950622 | |
| DATED | : July 21, 2009 | |
| INVENTOR(S) | : Huelsman et al. | |

It is certified that error appears in the above-identified patent and that said Letters Patent is hereby corrected as shown below:

At column 2, cover page, item (56), (Other Publications) line 1, please delete "Manipulation" and insert -- Manipulations --.

At column 2, cover page, item (57), (Abstract) line 16, please delete "arc" and insert -- are --.

At column 17, line 15, Claim 1, delete "configuration" and insert -- configuration, --.

At column 17, line 45, Claim 1, delete "components" and insert -- component --.

At column 18, line 44, Claim 9, start a new line and indent after "8," and before "where".

At column 18, line 47, Claim 9, start a new line and indent after "; and" and before "where".

At column 18, line 48, Claim 10, start a new line and indent after "8," and before "where:".

At column 18, line 51, Claim 10, start a new line and indent after "; and" and before "where".

At column 18, line 58, Claim 12, delete "validate" and insert -- validate a --.

At column 20, line 6, Claim 18, delete "that" and insert -- that, --.

At column 20, line 10, Claim 18, delete "rule:" and insert -- rule; --.

At column 20, line 17, Claim 18, delete "rules;" and insert -- rule; --.

Signed and Sealed this
Fifteenth Day of March, 2011

David J. Kappos
*Director of the United States Patent and Trademark Office*